United States Patent [19]

Latimer

[11] 3,998,737
[45] Dec. 21, 1976

[54] FILTER ARRANGEMENT WITH SPLIT HYDRAULIC TANK

[75] Inventor: Eugene E. Latimer, Wilmington, Ill.

[73] Assignee: Caterpillar Tractor Co., Peoria, Ill.

[22] Filed: Apr. 25, 1975

[21] Appl. No.: 571,832

[52] U.S. Cl. ............................. 210/172; 210/236; 210/476
[51] Int. Cl.² ................................. B01D 35/02
[58] Field of Search .......... 210/172, 232, 236, 447, 210/455, 459, 463, 475, 476

[56] References Cited

UNITED STATES PATENTS

| | | | |
|---|---|---|---|
| 2,877,902 | 3/1959 | Chase et al. | 210/440 |
| 3,062,377 | 11/1962 | Howard et al. | 210/232 X |
| 3,214,023 | 10/1965 | Donner | 210/172 |
| 3,288,289 | 11/1966 | Rosaen | 210/172 X |
| 3,288,291 | 11/1966 | Rosaen | 210/172 X |
| 3,313,417 | 4/1967 | Rosaen | 210/172 X |
| 3,313,418 | 4/1967 | Rosaen | 210/172 X |
| 3,358,835 | 12/1967 | Scheidt | 210/90 |
| 3,369,665 | 2/1968 | Paulson | 210/232 X |
| 3,426,903 | 2/1969 | Oleclto | 210/232 |
| 3,512,940 | 5/1970 | Shapiro | 210/459 X |
| 3,524,550 | 8/1970 | Grant et al. | 210/252 |
| 3,750,888 | 8/1973 | Rinaldo | 210/172 |

Primary Examiner—Theodore A. Granger
Attorney, Agent, or Firm—Phillips, Moore, Weissenberger, Lempio & Strabala

[57] ABSTRACT

A fluid reservoir and filter combination includes a reservoir made of upper and lower sections with a filter support assembly comprising a base mounted in the lower section and a hold-down assembly mounted in the upper section. The filter assembly includes misalignment accommodating means comprising a particular configuration of the hold-down assembly including an elongated sleeve for extending into a filter element and a collar slidably mounted on the sleeve and biased toward the filter element for sealingly engaging the end of the filter element. The dimensions of the collar and sleeve element are such as to accommodate lateral misalignment of a filter element supported on the base member with respect to the hold-down assembly. Longitudinal misalignment is accommodated by means of the length of the sleeve member.

3 Claims, 3 Drawing Figures

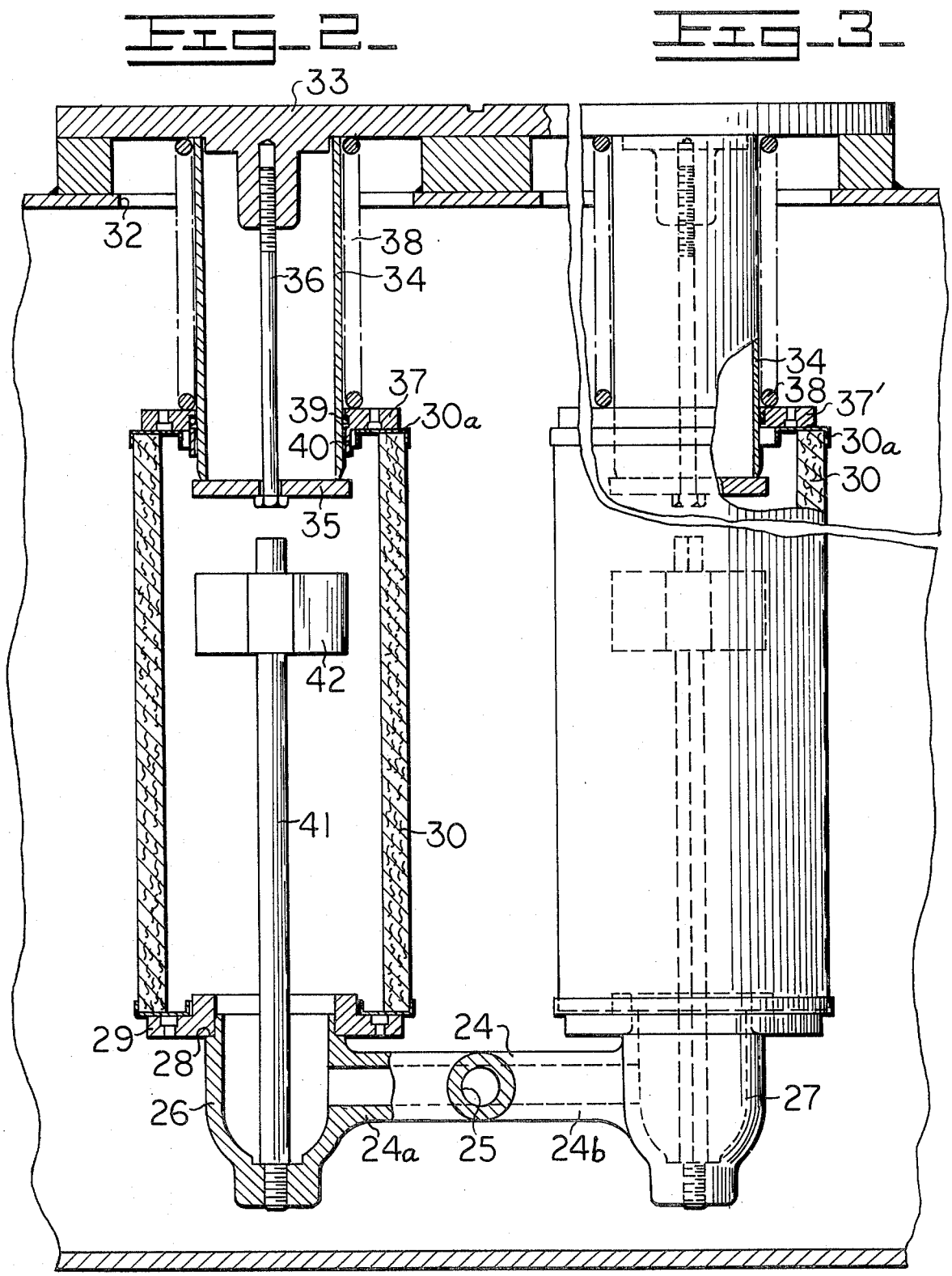

FILTER ARRANGEMENT WITH SPLIT HYDRAULIC TANK

BACKGROUND OF THE INVENTION

The present invention relates to reservoir-mounted filter assemblies and particularly to filter assemblies mounted within two-piece reservoirs.

Fluid reservoirs are commonly constructed in sections and detachably secured together to form the reservoir. This construction technique permits the various sections of the reservoir to be made of sheet metal and press-formed into the various sections, which are then bolted or otherwise secured together to form the final reservoir. This usually has the advantage of being a cheaper construction, as well as permitting the reservoir to be disassembled for cleaning if necessary.

One problem with this technique is that the dimensional tolerances between the various portions of the tank are difficult to maintain. Such tolerances become a problem when it becomes necessary to mount elements of the system between any two portions of the tank.

For example, one preferred form of reservoir is constructed of upper and lower half shells. It has been found that it is desirable for a filter element to be mounted within the reservoir and that the base of the filter element be mounted below the fluid level within the reservoir to reduce aeration. With such two-piece reservoirs as just described the base of the filter assembly is necessarily mounted on the bottom of the reservoir and the cover and hold-down portion of the filter assembly is normally mounted within an access opening in the upper part of the reservoir. The access opening must be above the liquid level and thus is normally in the top portion of the tank.

It is generally necessary that certain minimum tolerances be maintained between the filter base and the cover member or hold-down member in order to assure that proper sealing occurs around the filter to insure that the fluid is properly filtered. Maintaining such tolerances is extremely difficult and normally requires considerable expense, especially for two-piece tank assemblies as described above.

SUMMARY AND OBJECTS OF THE INVENTION

Accordingly, it is a primary object of the present invention to overcome the above problems of the prior art.

A further object of the present invention is to provide means for accommodating a wide range of tolerances within a filter assembly.

A further object of the present invention is to provide a filter assembly with means for accommodating a wide range of tolerances between the base of the filter assembly and the cover of the filter assembly.

Still another object of the present invention is to provide a filter and reservoir combination for a two-piece reservoir wherein the filter assembly includes a base secured to one piece of the reservoir and a cover secured to the other part of the reservoir wherein the filter assembly includes means to accommodate misalignment between these portions of the filter assembly.

In accordance with the primary aspect of the present invention, a two-part reservoir having a filter assembly mounted therein with the base of the filter assembly secured to the lower part of the housing and the cover of the filter assembly secured to the upper part of the housing is provided with misalignment accommodating means to accommodate any misalignment between the cover and base of the filter assembly.

BRIEF DESCRIPTION OF THE DRAWING

The above and other objects and advantages of the present invention will become apparent from the following description of the invention when taken in conjunction with the drawings, wherein:

FIG. 2 is a detailed view partially in section of the filter assembly of FIG. 1; and, FIG. 3 is a detailed view of a portion of an alternate embodiment of the invention.

DETAILED DESCRIPTION OF THE PREFERRED EMBODIMENTS

Figure 1:
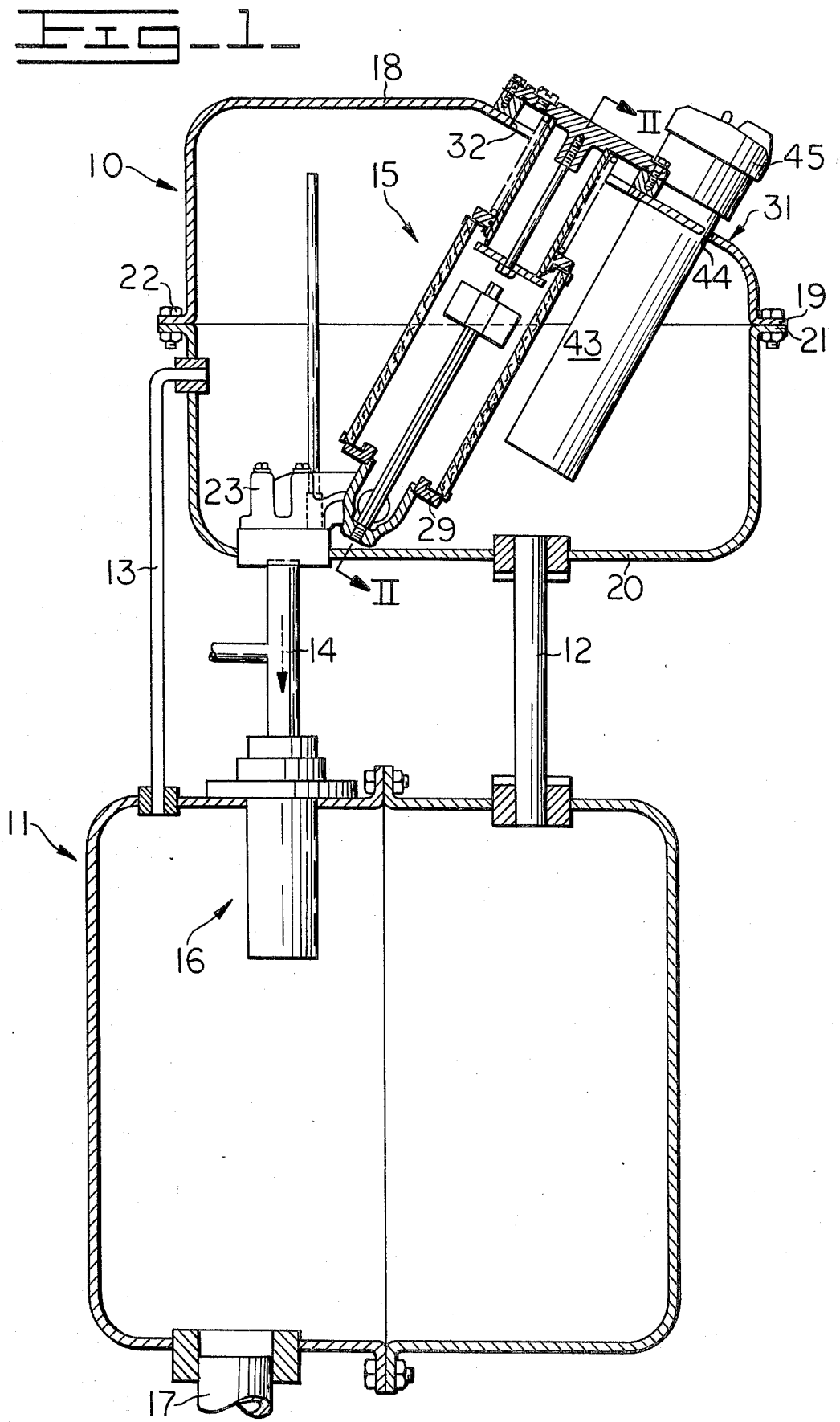
FIG. 1 is an elevational view in section of a fluid reservoir embodying the present invention.

Turning now to FIG. 1, there is illustrated a two-part tank or reservoir embodying a preferred embodiment of the present invention. The reservoir system includes an upper tank generally designated by the numeral 10 in communication with a lower tank generally designated by the numeral 11. A fluid transfer line 12 is connected between the tanks to transfer line 13 is connected between the upper and lower tanks to communicate air from the lower tank to the upper tank. A fluid return line 14 includes a branch extending to the upper tank 10 and communicating with a filter assembly indicated generally at 15 for filtering the return fluid, and a branch extending into the lower tank 11 and preferably including a bypass or relief valve indicated generally at 16 for bypassing the filter assembly 15 should it become clogged. A supply line 17 communicates at the lower reservoir 11 for supplying fluid to a pump or the like.

The second tank 11 is not essential to the present invention and is purely for illustration purposes. The second tank accordingly may be of any suitable configuration or construction or may be eliminated entirely for the purposes of the present invention.

The upper tank or reservoir 10 may be of any suitable configuration and constructed of any number of separate portions but, as illustrated, comprises an upper housing member 18 having a flange or other suitable means 19 secured to a lower housing member 20 having a like or corresponding flange 21 or other suitable means. The upper and lower housing members 18 and 20 may be of any suitable configuration but, as illustrated, comprising generally half-shell-like configurations having suitable means such as flanges 19 and 21 for detachably securing the half-shells together for defining an enclosable reservoir. It will be seen that the tank is separated along a generally horizontal plane such that one half-shell member 18 comprises the upper one-half of the tank and the other half-shell-like member 20 comprises the lower half of the tank. The two housing members 18 and 20 are secured together along flanges 19 and 21 by suitable means such as a plurality of bolts 22. Other suitable seal means between the flanges may be provided for insuring a liquid tight seal.

The filter assembly itself may be a single cartridge filter assembly or a dual cartridge assembly as illustrated. The filter assembly itself, as best illustrated in FIGS. 1 and 2, comprises a base member 23 secured to the lower housing 20 and including outwardly extending generally T-shaped configuration 24 having a central fluid passageway 25 conveying fluid outward of the two arms 24a and 24b communicating the inlet conduit with a pair of cup-like members 26 and 27 on the outer ends of the oppositely extending arms.

The description hereinafter will be confined to a single one of the filter assemblies in view of the fact that both filters and the mounting arrangement are identical. Each of the cup members includes an annular shoulder 28 for receiving a seal and support ring or collar 29. The ring or collar 29 engages and supports the lower end of a filter element 30. The upper end of the filter element 30 is held in place by the filter cover and hold-down assembly.

The upper portion of the upper housing member 18 includes an angled surface portion 31 extending at an angle to the upper surface and presenting better access to the filter element and filter cap. The slanted surface portion 31 of housing 18 includes an access opening 32 for the insertion and removal of the filter element 30. This access opening 32 is preferably in alignment with the filter seat defined by collar 29.

A filter hold-down assembly includes a cap or cover 33 fitted over the openings 32 which includes an elongated cylindrical sleeve 34 of sufficient length to extend beyond the upper end of the filter element 30. The sleeve 34 is mounted to the cover 33 in a suitable manner such as by means of an end plate 35 and a bolt 36. A collar or ring member 37 is slidably mounted on the outer surface of diameter of the collar or sleeve 34 and is biased by means of suitable resilient means such as a compression spring 38 toward the upper end of the filter element 30. The collar 37 sealingly engages the upper end of the filter element 30 and includes a suitable seal means 39 for sealingly engaging the outer diameter of sleeve 34. The collar 37 includes an annular extension 40 which extends into the annular end piece 30a of filter element 30 and is of such diameter to significantly clear the inner diameter of the member 30a. Thus, the outer diameter of the sleeve 34 and the outer diameter of the extension 40 of the collar 37 is sufficiently less than the inner diameter of the filter element 30 and its end piece 30a to accommodate significant lateral misalignment on the upper end of the filter element therewith.

It will also be appreciated that the length of the sleeve 34 is sufficient to extend sufficiently into the upper end of the filter element 30 to accommodate significant longitudinal dimensional tolerances between the lower support collar 29 and the cover plate 33. Thus the upper collar 37 is permitted to accommodate this longitudinal misalignment.

It will be appreciated that ideally the plane of surface 31 and the plane of collar 29 will be parallel and that opening 32 and, more particularly, collar 34 will be concentric or coaxial with the support collar 29. However, because of manufacturing techniques, it will be appreciated that this will not necessarily be so. Accordingly, the present construction as above described was conceived and developed to accommodate such misalignment. This problem of course is magnified by the fact that it is preferable that the base member 23 and lower support means for the filter be located in the bottom of the tank so that the lower end of the filter is submerged within the fluid in order to reduce aeration of the fluid. As will be appreciated, fluid will flow into the internal passage along to the cup member 26 and into the interior of the annular filter element 30 and therethrough the walls thereof into the reservoir. Thus, if the fluid falls through the air and into the underlying level of fluid, aeration can occur.

An internal support member for catching the filter element when the cover and upper support or hold-down means is removed comprises an upwardly extending rod 41 mounted by suitable means such as threads within the lower support means and extends upward within the bore of the filter element 30.

A plurality of finger-like members 42 extend regularly outward from the support member 41 while engaging the inside of the filter element 30. Thus, when the cover 33 is removed, the filter element will fall downward into engagement with the fingers 42 and will be supported thereby until the filter element can be removed.

The reservoir 10 also includes a suitable filter tube 43 extending through an opening 44 in the upper surface 31 of upper housing 18 and includes a removable filler cap 45.

It will be appreciated that the level of fluid in the upper tank will be maintained at a level above the lower end of the filter element 30 and may be as high as the upper end of the filter element.

An alternate embodiment is illustrated in FIG. 3 wherein a collar 37' is constructed to omit the sleeve extension of the previous embodiment. Thus, in this embodiment the clearance between the inner diameter of filter end piece 30a and the sleeve 34 accommodate misalignment of a filter element due to misalignment of the base member 29.

From the above description it is seen that there is provided a reservoir and filter combination wherein a two-part reservoir is provided with suitable filter assembly as adapted to accommodate misalignment between a base support member mounted in a lower housing member and an upper cap member or hold-down member mounted in the upper housing member of the reservoir.

What is claimed is:
1. A fluid reservoir and filter combination comprising:
   a first housing member and a second housing member, said members detachably secured together to define a fluid reservoir;
   a fluid filter support assembly mounted within said reservoir;
   said filter assembly comprising a filter support base mounted in and secured solely to one of said housing members;
   a filter hold-down assembly mounted within and secured solely to the other of said housing members; and,
   said filter hold-down assembly defining misalignment accommodating means for accommodating lateral misalignment of a filter element supported between said base and said hold-down assembly, and includes;
   a removable cover secured to the other housing member over an opening therein for insertion and removal of a filter element,
   an elongated cylindrical sleeve constructed and arranged so as to extend into an annular filter element,
   an end plate in contact with the extended end of the sleeve,
   means interconnecting the cover and end plate,
   a collar slidably mounted on said sleeve for engaging the end of a filter element, biasing means for biasing said collar along said sleeve into engagement with the end of a filter element, said sleeve having a length extending within the interior of the filter element, and means fixed relative to said one housing for extending into a filter element, whereby said sleeve and said collar have radial dimensions defining sufficient clearance to accommodate large variations in axial alignment thereof relative to a filter element extending and supported between said base member and said hold-down assembly.

2. The combination of claim 1 wherein said housing members are detachably secured along a generally horizontal plane so that one of said housing members defines the bottom of said reservoir; and said base member is secured to said member defining said bottom.

3. The combination of claim 2 wherein said housing members have a generally half-shell configuration.

* * * * *